Figures 1, 2:
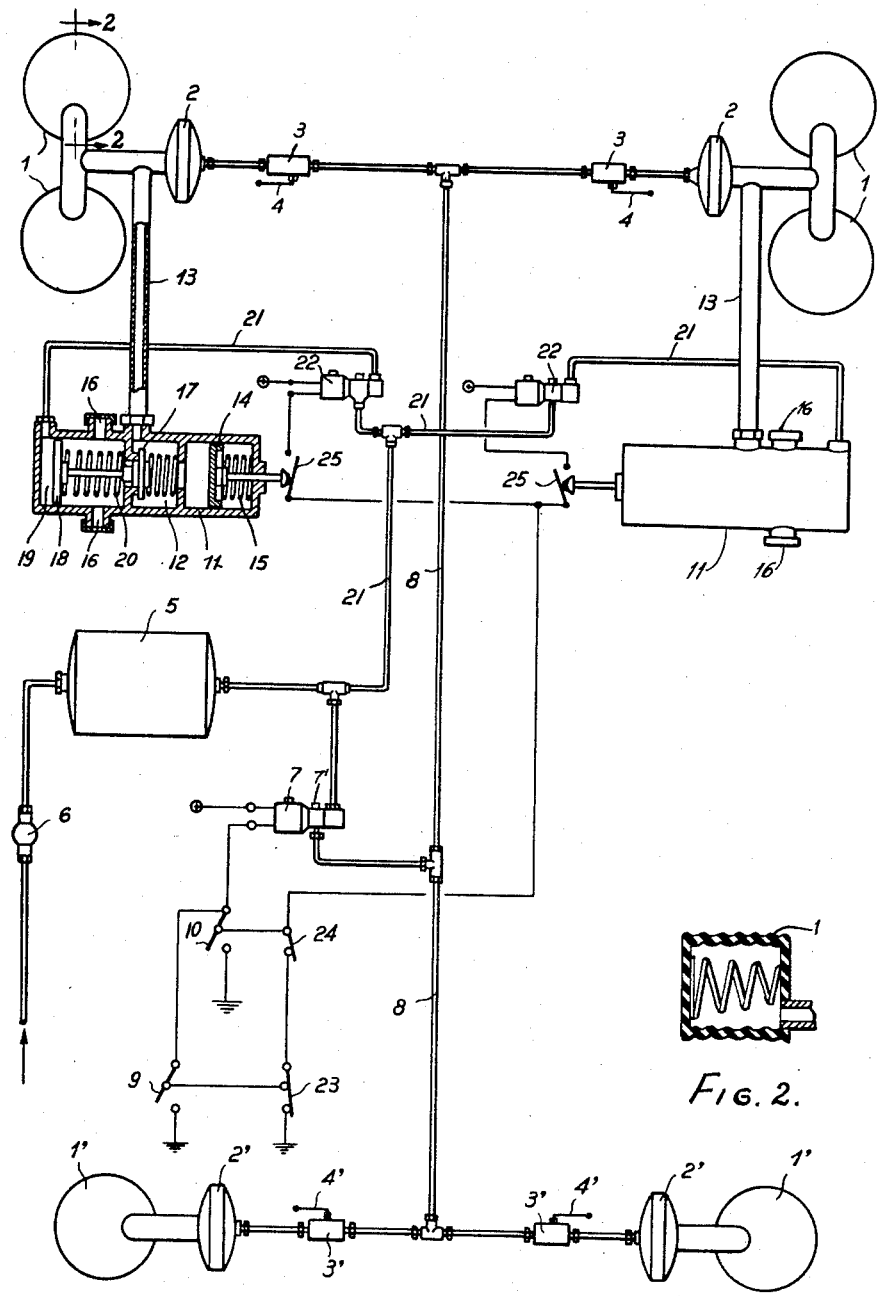

Feb. 18, 1964   G. ALFIERI ETAL   3,121,573
DEVICE FOR EXHAUSTING THE AIR SPRINGS OF VEHICLE PNEUMATIC
MECHANICAL SUSPENSION SYSTEMS TO THE OUTER ATMOSPHERE
Filed May 12, 1961

United States Patent Office 3,121,573
Patented Feb. 18, 1964

3,121,573
DEVICE FOR EXHAUSTING THE AIR SPRINGS OF VEHICLE PNEUMATIC MECHANICAL SUSPENSION SYSTEMS TO THE OUTER ATMOSPHERE
Giuseppe Alfieri and Roberto Moriondo, Milan, Italy, assignors to Fabbrica Italiana Magneti Marelli S.p.A., a corporation of Italy
Filed May 12, 1961, Ser. No. 109,667
Claims priority, application Italy May 28, 1960
4 Claims. (Cl. 280—6)

The present invention refers to a device for exhausting the air springs of vehicle pneumatic mechanical suspension systems to the outer atmosphere.

The device according to the present invention is related to pneumatic mechanical suspension systems in which the resilient elements located between the chassis and the wheel axle are comprised of cylindrical spiral springs enclosed in a plastic (rubber or other) material sheath.

In the above mentioned elements the sheath constitutes with its internal chamber, the real and proper air spring which is linked up to levelling devices which regulate the air pressure in the chamber in relation to the load acting on the vehicle.

Normally in pneumatic mechanical suspension systems of the above mentioned type, the resilient elements are constructed in such a manner that the metallic coil spring supports the weight of the vehicle itself, while the pneumatic part supports the working load on each wheel.

Obviously with this particular type of arrangement of the resilient elements, the levelling device adjusts the pressure in the air springs in such a manner that with the vehicle unloaded, the pressure in the springs is equal to atmospheric pressure; this is why, in such a particular case, the pneumatic springs do not have to collaborate in the supporting of the vehicle.

One defect which arises in this pneumatic mechanical suspension system derives from the fact that the presence of air in the springs when the vehicle is under only tare load, may render the suspension excessively rigid, due to the extra pressures which can be reached by the air, and caused by the oscillations of the vehicle during travel.

The above defect becomes particularly felt in cases where self acting levellers are employed ( that is to say the type of which become activated only when there are effective load variations on the vehicle), but which are inactive during the travelling motion of the vehicle; thus completely isolating the internal part of the springs from the atmosphere, making it impossible for them to exhaust to the outer atmosphere. For a full description of such a leveller see U.S. Patent No. 3,079,170. It is not possible on the other hand to provide the pneumatic spring with an automatic exhaust valve, constituted for example by a plate spring closing a hole located at the bottom of the sheath, because in load conditions differing from only the tare load, said spring could perhaps open and not close again during the oscillations of the vehicle in motion, with subsequent overloading of the metallic part of the springs.

The aim of the present invention is to eliminate the above mentioned defects in pneumatic mechanical suspension systems where the air springs are linked up to self acting levelling devices.

The substance of the invention is substantially characterised by the fact that it comprises suitable means for putting the pneumatic suspension elements into communication with the atmosphere, and follow up linkage means to the control device of the levellers, and a pneumatic element which is responsive to the pressure in the pneumatic suspension elements, said linkage means acting on the first mentioned means in order to place the pneumatic suspension element into communication with the atmosphere whenever the levellers are inactive and the pressure in the pneumatic elements is substantially equal to that of the atmosphere.

The invention will be described with reference to the attached schematic drawing, which is furnished purely as an indicative example, and wherein FIGURE 1 shows a preferred embodiment of the device suited to control the rear pneumatic suspensions of a vehicle, and FIGURE 2 is a cross section taken along line 2—2 of FIGURE 1.

The resilient elements 1 of the rear pneumatic suspension system are interposed in a commonly known way between the chassis and the wheel axle of the vehicle, and communicate with the added volumes 2 for increasing the capacity of the pneumatic parts of the resilient suspension elements to suit the diverse features of the mechanical spring and also of the air spring.

Air flow and discharge of the resilient elements 1 is controlled by levellers 3 operated by the external control 4, responsive to the load variations, to connect the elements 1 with the compressed air source 5 or with the atmosphere.

The corresponding parts of the vehicle front suspension are indicated with the same reference numerals, except the reference numerals are primed.

The compressed air source is constituted by the reservoir tank 5, which is fed by a compressor (not shown) through a pressure regulating valve 6.

The compressed air from tank 5 reaches a three ported electrodistributor 7, which controls the air inlet pipes 8 to the levellers 3. The electrodistributor 7 has one port connected to the tank 5, a second port connected to the pipe 8 and a third port 7' communicating with the atmosphere.

In the exciting circuit of the electrodistributor 7 are inserted two switches 9 and 10 in parallel, the first being controlled automatically for example by the vehicle door (if the vehicle is for passenger transport) and by another device which intervenes in relation to the motion conditions of the vehicle, or the motor speed, the second being hand controlled.

The valve device (only one being shown in cross-section) for discharging each of the air springs 1 is comprised of a body or housing 11, the central chamber 12 of which is in communication with the air springs 1 through pipe 13. Chamber 12 also communicates with a cylinder having a piston 14 slidable therein against a return spring 15. Chamber 12 can be open to the atmosphere through port 16 when the closure 17 is raised from its air tight seat by means of piston 18 which slides in cylinder 19 against the action of return spring 20.

Cylinder 19 is fed with compressed air from tank 5 through pipe 21 which is controlled by a three ported electrodistributor 22 which is substantially identical to electrodistributor 7.

In the exciting circuit of electrodistributor 22 are inserted three switches in series 23, 24 and 25. The two switches 23 and 24 are rigidly connected to switches 9 and 10, respectively, in the sense that the opening of one corresponds to the closure of the other and vice versa. Contact 25 is operated by the piston rod of piston 14 which is influenced by the pressure in the airsprings 1. When the air spring pressure exceeds the load of spring 15, contact 25 is opened.

The performance of the device in the various conditions of motion and load of the vehicle is as follows:

*Vehicle Travelling Under Load*

In this condition the pressure in the air springs 1 is equal to the working load on the vehicle.

Contact 9 is open, the circuit of the electrodistributor 7 is disconnected and therefore delivery pipe 8 and the levellers 3 are in the discharge phase with the result that the levellers are inactive.

Opening of contact 9 determines the simultaneous closure of contact 23. Contact 24 is also closed being associated to contact 10 which is normally kept open.

The circuit of electrodistributor 22 is disconnected by the opening of contact 25 caused by the compressed air in springs 1 acting on piston 14.

When the electrodistributor 22 is deenergized its atmospheric port and its port for conduit 21 are connected whereby the cylinder 19 communicates with the atmosphere and piston 18 is in the rest position. Valve 17, being maintained closed by its spring, intercepts the communication between the springs 1 and the atmosphere through port 16.

Unloading of the Vehicle Under Load

On the vehicle being stopped, due to the automatic closure of contact 9, the electrodistributor 7 is excited and the levellers 3 are again activated to regulate the pressure in air spring 1 according to the load in the vehicle. Thus, communication between the tank 5 and the air springs 1 is effected only when electrodistributor 7 is energized and levellers 3 are activated. On the diminishment of the load from the vehicle, the levellers 3 gradually reduce the communication between tank 5 and air springs 1 until the pressure in the air springs becomes negligible; since the air spring pressure is negligible the piston 14 is moved by its spring 15 causing the switch 25 to close.

However the circuit of distributor 22 remains disconnected because of contact 23 which remains open. The exhaust valve 17 meanwhile remains closed because of the fact that cylinder 19 is discharged through the electrodistributor 22.

Unloaded Vehicle in Motion

Consider the components of the system to be in the positions described at the termination of the above described condition, and it follows that as soon as the vehicle begins to move, that the automatic opening of contact 9 simultaneously determines the closure of contact 23 causing the electrodistributor 22 to become excited.

Cylinder 19 is placed under pressure, piston 18 moves from its rest position and opens valve 17 putting springs 1 in direct communication with the atmosphere through pipe 13, chamber 12, and ports 16.

This condition is maintained during the entire time that the vehicle is in motion avoiding over pressures in springs 1 due to the oscillations of the vehicle. Naturally with the opening of contact 9, the electrodistributor 7 is cut out and the levellers inactivated.

Loading the Unloaded Vehicle

When the vehicle stops, and due to the opening of contact 23 following the closure of contact 9, the electrodistributor 22 is cut out, with the result that cylinder 19 becomes discharged and valve 17 closes. At the same time the levellers are activated by means of the exciting of the electrodistributor 7 which puts them in communication with tank 5.

Increase of load on the vehicle therefore increases the pressure in the air springs which are now isolated from the atmosphere, and such pressure acting on piston 14 causes the opening of switch 25.

Movement of Loads on Half Empty Vehicle

When the load conditions of the vehicle are almost equal to that of the tare of the vehicle a displacement of the load during motion could result in a weight distribution on the axles different to that which was determined during the loading phase.

It follows therefore that the pressure in the air springs of one of the axles of the vehicle does not correspond to the load which acts on the other axle due to the displacement, with the result that the suspensions are not capable of maintaining the chassis at its original level.

In order to regain the desired level, it is sufficient in this case to operate the manual switch 10.

In this case the previously described operations are repeated as in the example of loading an unloaded vehicle when the load is brought onto the axle or in the case of unloading of a loaded vehicle, and an unloaded vehicle in motion if the load has been displaced from the axle.

In practice the arrangement details of the device can vary from those in the example described without departing from the scope of the invention.

We claim:

1. A pneumatic-mechanical vehicle suspension system of the character described comprising pneumatic-mechanical spring means mounted between a vehicle axle and frame, a source of air pressure connected to the pneumatic spring means, exhaust valve means operatively connected to the pneumatic spring means for maintaining the pneumatic spring means open to atmosphere when the vehicle is unloaded and underway, the source of air being connected to the exhaust valve means for pneumatically actuating the exhaust valve means, an electrodistributor interposed between the air source and the exhaust valve means for controlling the flow of air from the air source to the exhaust valve means, and switch means operatively connected to the exhaust valve means and the electrodistributor, whereby compressed air flows from the air source through the electrodistributor to the exhaust valve means.

2. A pneumatic-mechanical vehicle suspension system according to claim 1 wherein the exhaust valve means including a housing, a conduit having one end connected to the housing and the opposite end connected to the pneumatic-mechanical spring means, a port formed in the housing placing the interior of said housing into communication with the atmosphere, spring biased valve means positioned within the housing between one end of the conduit and the port to prevent the exhaust of air to the atmosphere from the pneumatic spring means through the port, a piston slidably mounted within the housing, a valve actuating rod mounted on one face of the piston for opening the spring biased valve means, and a conduit connecting the housing to the electrodistributor for admitting air into the housing against the opposite face of the piston, whereby when the air pressure entering the housing from the electrodistributor is greater than the air pressure within the pneumatic spring means, the piston and its associated rod slide toward the spring biased valve means to open said valve means thereby placing the pneumatic spring means into communication with the atmosphere.

3. A pneumatic-mechanical vehicle suspension system according to claim 1 wherein the exhaust valve means comprises a housing, a conduit having one end connected to the housing and the opposite end connected to the pneumatic-mechanical spring means, a port formed in the housing placing the interior of said housing into communication with the atmosphere, spring biased valve means positioned within the housing between one end of the conduit and the port to prevent the exhaust of air to the atmosphere from the pneumatic spring means through the port, a first piston slidably mounted within the housing at one end thereof, a valve actuating rod mounted on one face of the piston for opening the spring biased valve means, a conduit connecting one end of the housing to the electrodistributor for admitting air into the housing against the opposite face of the piston, whereby when the air pressure entering the housing from the means into communication with the atmosphere, the opposite end of the housing having a second piston slidably electrodistributor is greater than the air pressure within the pneumatic spring means, the piston and its associated rod slide toward the spring biased valve means to open said valve means thereby placing the pneumatic spring means into communication with the atmosphere, the opposite end of the housing having a second piston slidably mounted therein, one face of the second piston having a rod mounted thereon and extending outwardly from the housing for opening the switch means, and spring means positioned between the second piston and the housing biasing the switch actuating rod inwardly of the housing, the opposite face of the second piston being exposed to the air pressure within the pneumatic spring means, whereby when the air pressure within the pneumatic spring means is greater than the biasing force of the rod spring means, the rod is moved outwardly from the housing to open the switch means thereby preventing the flow of compressed air from the air source through the second electrodistributor into the exhaust valve means.

4. A pneumatic-mechanical vehicle suspension system of the character described comprising pneumatic-mechanical spring means mounted between a vehicle axle and frame, a source of air pressure for supplying compressed air to the pneumatic spring means, levelling valve means interposed between the air source and the pneumatic spring means for regulating the flow of air to the pneumatic spring means, a first electrodistributor interposed between the source of air and the levelling valve means for controlling the flow of air to the levelling valve means, exhaust valve means operatively connected to the pneumatic spring means for maintaining the pneumatic spring means open to atmosphere when the vehicle is unloaded and underway, the source of air being connected to the exhaust valve means for pneumatically actuating the exhaust valve means, a second electrodistributor interposed between the air source and the exhaust valve means for controlling the flow of air from the air source to the exhaust valve means, first switch means connected to the first electrodistributor for energizing said distributor whereby, compressed air flows from the air source through the first electrodistributor to the levelling valves, and second switch means operatively connected to the first switch means and to the second electrodistributor for energizing the second electrodistributor, whereby compressed air flows from the air source through the second electrodistributor into the exhaust valve means.

References Cited in the file of this patent
UNITED STATES PATENTS
2,257,913    Maranville _____ Oct. 7, 1941